A. P. ANDREWS.
ASH SIFTER.
APPLICATION FILED FEB. 5, 1915.
1,141,297.
Patented June 1, 1915.
2 SHEETS—SHEET 1.
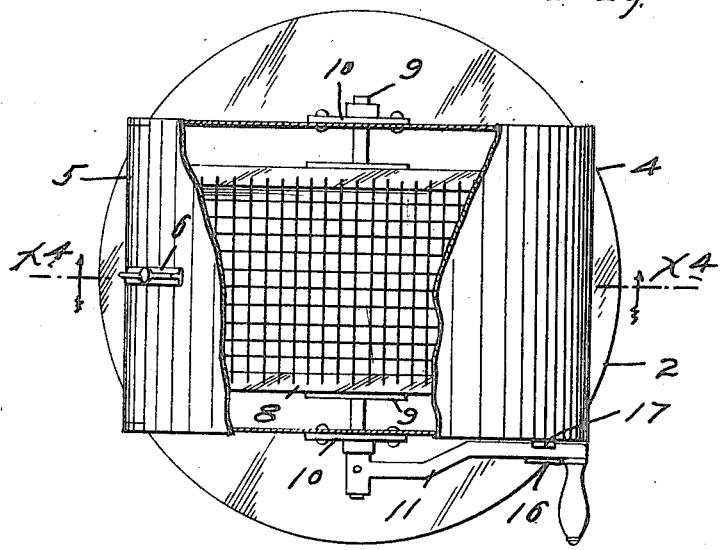
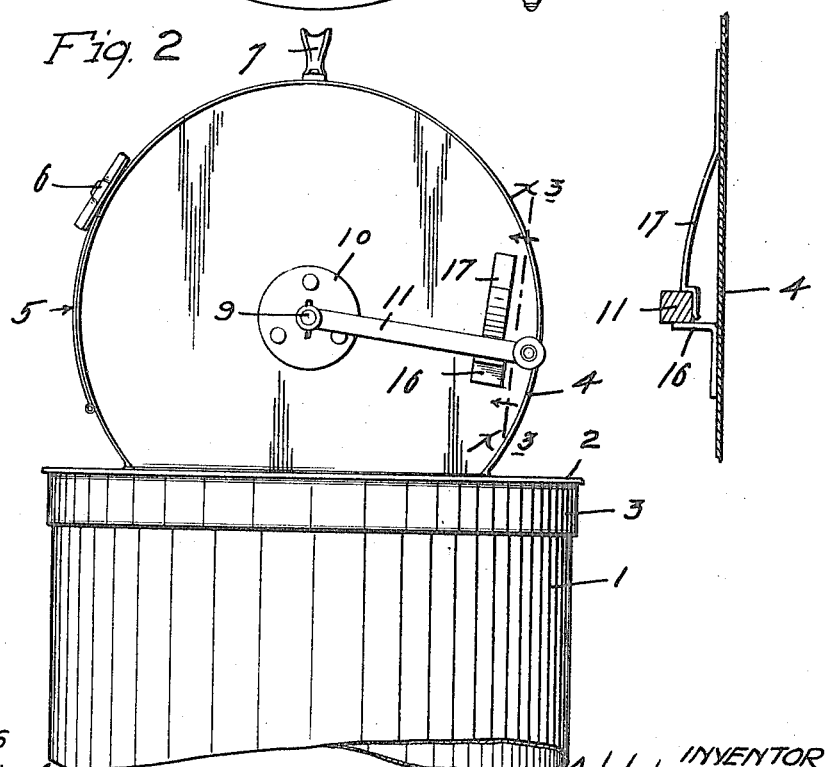

A. P. ANDREWS.
ASH SIFTER.
APPLICATION FILED FEB. 5, 1915.
1,141,297.
Patented June 1, 1915.
2 SHEETS—SHEET 2.
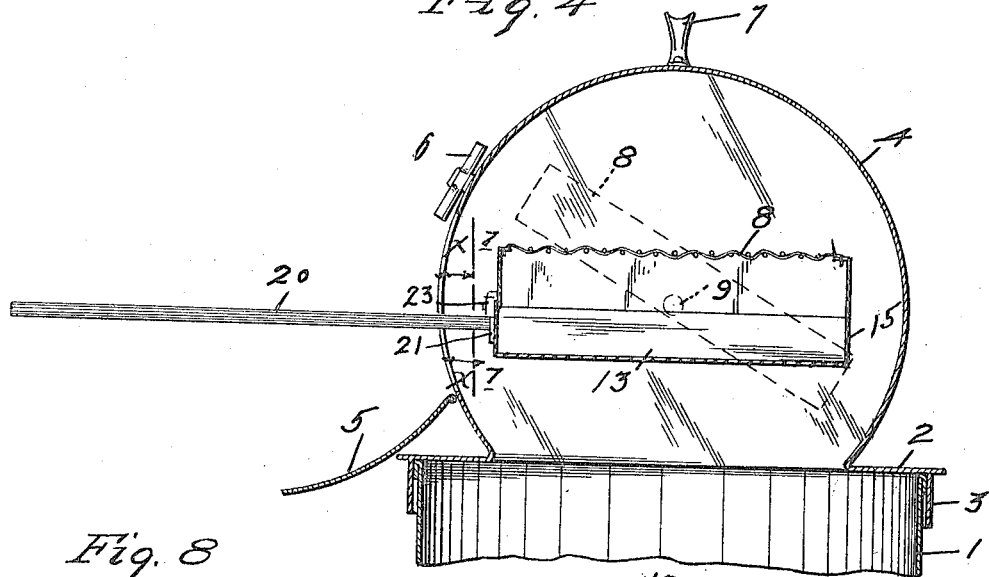
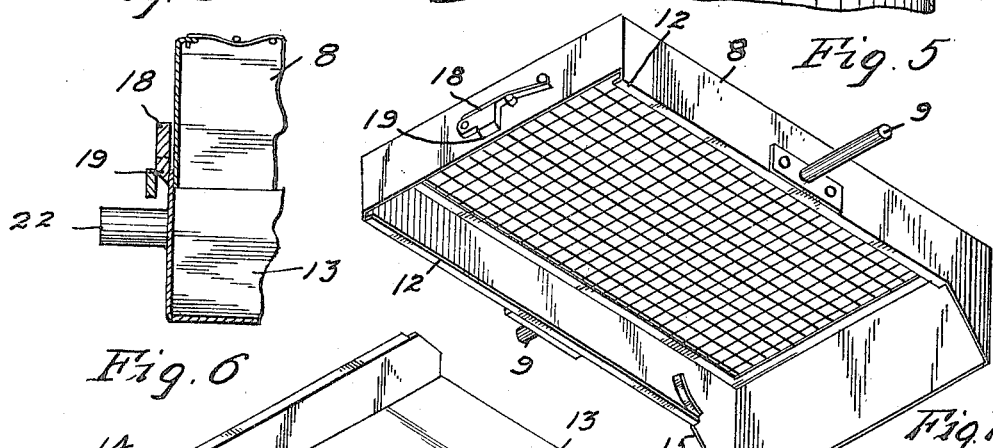
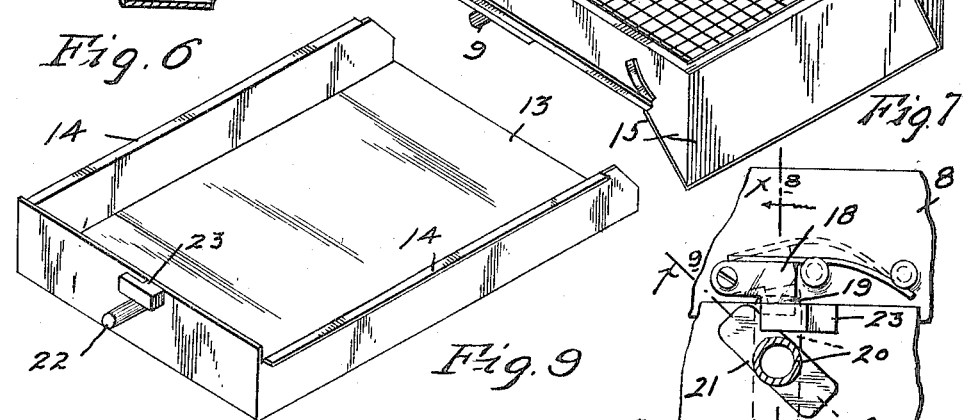
WITNESSES
E. C. Skinkle
H. D. Kilgore
INVENTOR
Adolph P. Andrews
BY HIS ATTORNEYS
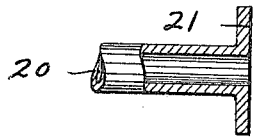

UNITED STATES PATENT OFFICE.

ADOLPH P. ANDREWS, OF MINNEAPOLIS, MINNESOTA.

ASH-SIFTER.

1,141,297.   Specification of Letters Patent.   Patented June 1, 1915.

Application filed February 5, 1915. Serial No. 6,283.

*To all whom it may concern:*

Be it known that I, ADOLPH P. ANDREWS, a citizen of the United States, residing at Minneapolis, in the county of Hennepin and State of Minnesota, have invented certain new and useful Improvements in Ash-Sifters; and I do hereby declare the following to be a full, clear, and exact description of the invention, such as will enable others skilled in the art to which it appertains to make and use the same.

My invention relates to improvements in ash sifters; and, to this end, it consists of the novel devices and combinations of devices hereinafter described and defined in the claims.

In the accompanying drawings, which illustrate the invention, like characters indicate like parts throughout the several views.

Referring to the drawings: Figure 1 is a plan view of the invention, some parts being broken away; Fig. 2 is a side elevation of the same, some parts being broken away; Fig. 3 is a detail view, principally in section, taken on the line $X^3 X^3$ of Fig. 2, on an enlarged scale; Fig. 4 is a view, partly in side elevation and partly in vertical section, taken on the line $X^4 X^4$ of Fig. 1, some parts being broken away and some parts being shown in different positions, by means of broken lines; Fig. 5 is a perspective view of the sieve box in an inverted position; Fig. 6 is a perspective view of the shovel with its handle removed; Fig. 7 is a detail view, partly in front elevation and partly in vertical section, taken on the line $X^7 X^7$ of Fig. 4; Fig. 8 is a detail view, principally in section, taken on the line $X^8 X^8$ of Fig. 7; and Fig. 9 is a detail view, principally in longitudinal section, taken on the line $X^9 X^9$ of Fig. 7.

The numeral 1 indicates an ash can or receptacle having a removable cover 2, with a depending flange 3 telescoped onto the open end of said can. The cover 2 is also provided with a central opening, over which is located a hood 4 rigidly secured to said cover, and having communication with the can 1 through the opening in said cover. This hood 4 is provided with an opening normally closed by segmental cover 5, hinged at its lower horizontal edge for vertical swinging movement to and from a closed position. A turn button 6, secured to the hood 4, is provided for holding the door 5 closed. On top of the hood 4 is secured a hand piece 7, by which the improved ash sifter may be carried.

Mounted within the hood 4 is a reversible sieve box 8, having rigidly secured to its sides a pair of axially alined trunnions 9 journaled in bearings 10 secured to the sides of the hood 4. To the projecting end of one of the trunnions 9 is rigidly secured a hand crank 11, by which the sieve box 8 may be turned from a receiving to an emptying position or oscillated to separate the fine ashes from the cinders and good coal. The upper longitudinal edges of the sieve box 8 are turned horizontally inward to afford a pair of guide flanges 12, the purpose of which will presently appear.

Detachably secured to the sieve box 8, and opposed to its sieve surface, is a catch pan in the form of a shovel 13. The side and back walls of the shovel 13 are, as shown, straight, and the upper longitudinal edges of said side walls are bent horizontally outward to afford a pair of guide flanges 14 arranged to interlock with the flanges 12 of the sieve box 8 by an endwise sliding movement of said shovel 13. The sieve box 8 is provided at its rear end portion with an extension 15, which, when the shovel 13 is applied to the sieve box 8, closes the cutting end of the shovel 13. By reference to Figs. 4 and 6, it will be noted that the back wall of the shovel 13 is slightly higher than the side walls thereof, and, when the shovel 13 is applied to the sieve box 8, engages the front wall of the sieve box 8 to afford a stop which limits the inward sliding movement of the shovel 13 on the sieve box 8. To apply the shovel 13 to the sieve box 8, it is necessary to invert the sieve box 8, as best shown in Fig. 4. The sieve box 8 is held in this inverted position by a stop lug 16 and a coöperating spring latch 17, both of which are secured to the hood 4 and arranged to engage the hand crank 11 and hold the same against movement in either direction. The spring latch 17 is arranged to be moved into an inoperative position by the engagement of the hand crank 11 therewith, during the movement of said hand crank toward the stop lug 16 to allow said crank to pass the latch. To secure the shovel 13 against removal from the sieve box 8 is provided a spring latch 18 having a beveled detent 19, which overlaps the back wall of said shovel. This detent 19 is arranged to be engaged by the back wall of the shovel 13 during the sliding movement of said shovel on to the sieve box 8, and thereby catch said latch into an inoperative position. The handle 20 of the shovel 13 is made detachable, and, as shown, is secured in position by the following connections, towit: The inner end of the handle 20 is tubular in form, and has secured thereto a transversely extended head 21, the ends of which are beveled. On the rear end wall of the shovel 13 is rigidly secured a rearwardly projecting stud 22 and a lock lug 23. The tubular or socket end of the handle 20 is adapted to be telescoped onto the stud 22, and the head 21 is interlocked with the lug 23 by a rotary movement of said handle with respect to the shovel 13. When the head 21 is interlocked with the lug 23, the handle 20 is securely held in position on the shovel 13.

The operation of the improved ash sifter may be briefly described as follows: The sieve box 8 is first inverted, as shown in Fig. 4, and locked in this position by the engagement of the hand crank 11 with the lug 16 and latch 17 in a manner previously described. A shovel full of ashes is then removed from the ash pit by the shovel 13, and said shovel inserted into the hood 4 through the door opening formed therein. During the insertion of the shovel 13 into the hood 4, the flanges 14 of said shovel are slid into interlocking engagement with the flanges 12 of the sieve box 8, thereby interlocking the said shovel to the said sieve box. At the limit of the sliding movement of the shovel 13 on to the sieve box 8, the latch 18 is cammed into an inoperative position to allow the rear wall of said shovel to pass the same, as best shown in Fig. 8. The handle 20 is then removed from the shovel 13, first by a slight rotary movement thereof, to carry the head 21 out of interlocking engagement with the lug 23, and then, by an endwise movement, to carry said handle out of engagement with the stud 22. As the head 21 is rotated out of engagement with the lug 23, it is also moved out of engagement with the lock detent 19, thereby allowing said detent to move into an operative position under the action of the spring of the latch 18 to lock the shovel 13 to the sieve box 8. After the handle 20 is removed from the shovel 13, the door 5 is closed and locked by the turn button 6. Then by pressing inward on the spring 17 the hand crank 11 is released and the sieve box 8 is turned thereby into an upright position. During the movement of the sieve box 8, the ashes in the shovel 13 are deposited onto the sieve surface of said sieve box, and then by oscillating the sieve box 8 with the hand crank 11 the fine ashes are sifted through the sieve surface and deposited into the can 1 through the opening at the bottom of the hood 4. After the ashes have been removed from the sieve box 8 under the oscillatory movement thereof, the hand crank 11 is again turned back into its original position to invert the sieve box 8, and thereby deposit into the shovel 13 all of the good coal and cinders. The door 5 is now opened and the handle 20 applied to the shovel 13 by first telescoping the socket end of said handle onto the stud 22, and then giving the handle a sufficient rotation to carry its head 21 into interlocking engagement with the lug 23. During this rotary movement of the handle 20, the lock detent 19 is engaged by the head 21 and cammed thereby into an inoperative position to allow the shovel 13 to be withdrawn from the sieve box 8. The cinders and good coal remain on the shovel 13 and may be thrown into the fire box or into the bin.

From the foregoing description, it is evident that the ashes may be sifted without causing any dust, except that which may escape through the door opening in the hood when the door 5 is opened to remove the shovel 13. If the door 5 is not opened until sufficient time has elapsed to permit the dust within the hood 4 to settle, there will be practically no dust outside of the hood.

In case there is no good coal in the ashes taken from the ash pit, the sieve box 8 may be turned into a position as indicated by broken lines in Fig. 4, and the ashes shoveled directly into the can 1 through the door opening 5 in the hood 4.

What I claim is:

1. The combination with a hood, of a reversible sieve journaled in said hood, and having a detachable catch pan opposed to its sieve surface, said pan being in the form of a shovel having a detachable handle, a lock for securing said pan to the sieve box, said lock arranged to be released by the application of the handle to the shovel, and means independent of said handle for oscillating said sieve box.

2. The combination with a hood, of a reversible sieve box, mounted in said hood, and having a detachable catch pan opposed to its sieve surface, said pan being in the form of a shovel having a detachable handle, said sieve box having an extension closing the cutting edge of said shovel when applied thereto.

3. The combination with a hood, of a reversible sieve box, journaled in said hood, and having a detachable catch pan opposed to its sieve surface, said pan being in the form of a shovel having a detachable handle, said sieve box having an extension closing the cutting edge of said shovel when applied thereto, and means independent of said handle for oscillating said sieve box.

4. The combination with a hood having a door equipped opening, of a reversible sieve box intermediately journaled in said hood, and having a detachable catch pan opposed to its sieve surface, said pan being in the form of a shovel having a detachable handle, said handle being insertible through the door opening of said hood in applying and removing said pan from the sieve box, and means independent of said handle for oscillating said sieve box.

5. The combination with a hood having a door equipped opening, of a reversible sieve box intermediately journaled in said hood, and having a detachable catch pan opposed to its sieve surface, said pan being in the form of a shovel having a detachable handle, said handle being insertible through the door opening of said hood in applying and removing said pan from the sieve box, and means for locking said sieve box in an inverted position.

6. The combination with a hood having a door equipped opening, of a reversible sieve box intermediately journaled in said hood, and having a detachable catch pan opposed to its sieve surface, said pan being in the form of a shovel having a detachable handle, and having interlocking engagement with said sieve box by an endwise sliding movement, a lock for holding said pan against removal from said sieve box, said lock arranged to be released by the application of the handle to said shovel, and means independent of said handle for oscillating said sieve box.

7. The combination with a hood having a door equipped opening, of a reversible sieve box intermediately journaled in said hood, and having a detachable catch pan opposed to its sieve surface, said pan being in the form of a shovel having a detachable handle, and having interlocking engagement with said sieve box by an endwise sliding movement, a spring lock for holding said pan against removal from said sieve box, said lock arranged to be released by the application of the handle to said shovel, means for oscillating said sieve box, and means for holding said sieve box inverted.

8. The combination with a hood, of a reversible sieve box mounted in said hood, and having a detachable catch pan opposed to its sieve surface, said pan being in the form of a shovel having a detachable handle, said sieve box having an extension closing the cutting end of said shovel when applied thereto.

In testimony whereof I affix my signature in presence of two witnesses.

ADOLPH P. ANDREWS.

Witnesses:
E. C. SKINKLE,
HARRY D. KILGORE.

Copies of this patent may be obtained for five cents each, by addressing the "Commissioner of Patents, Washington, D. C."